(12) United States Patent
Bodi et al.

(10) Patent No.: US 10,504,630 B2
(45) Date of Patent: Dec. 10, 2019

(54) METHOD AND SYSTEM FOR GENERATING ELECTRICITY USING WASTE NUCLEAR FUEL

(71) Applicants: Robert F. Bodi, Westlake, OH (US); Martin A. Stuart, Altadena, CA (US)

(72) Inventors: Robert F. Bodi, Westlake, OH (US); Martin A. Stuart, Altadena, CA (US)

( * ) Notice: Subject to any disclaimer, the term of this patent is extended or adjusted under 35 U.S.C. 154(b) by 504 days.

(21) Appl. No.: 15/111,829

(22) PCT Filed: Jan. 22, 2015

(86) PCT No.: PCT/US2015/012386
§ 371 (c)(1),
(2) Date: Jul. 15, 2016

(87) PCT Pub. No.: WO2015/160407
PCT Pub. Date: Oct. 22, 2015

(65) Prior Publication Data
US 2016/0372220 A1    Dec. 22, 2016

Related U.S. Application Data

(60) Provisional application No. 61/930,027, filed on Jan. 22, 2014.

(51) Int. Cl.
*G21C 19/48* (2006.01)
*G21G 1/02* (2006.01)

(52) U.S. Cl.
CPC .............. *G21C 19/48* (2013.01); *G21G 1/02* (2013.01)

(58) Field of Classification Search
CPC ........ G21C 19/00; G21C 19/42; G21C 19/44; G21C 19/48; G21F 9/00; G21F 9/28; G21F 9/30; G21G 1/02
See application file for complete search history.

(56) References Cited

U.S. PATENT DOCUMENTS

| 5,513,226 A * | 4/1996 | Baxter | G21C 1/12 376/170 |
| 5,811,944 A * | 9/1998 | Sampayan | H05H 9/00 315/500 |
| 7,173,385 B2 | 2/2007 | Caporaso et al. | |
| 7,576,499 B2 | 8/2009 | Caporaso et al. | |
| 9,728,280 B2 * | 8/2017 | Stuart | G21G 4/06 |

(Continued)

FOREIGN PATENT DOCUMENTS

| WO | 9512203 | 5/1995 |
| WO | 0072329 A2 | 11/2000 |

(Continued)

OTHER PUBLICATIONS

Habs, D., et al. "The Munich fission fragment accelerator." Nuclear Physics A 616.1-2 (1997): 39-44. <https://www.sciencedirect.com/science/article/pii/S0375947497000729>. (Year: 1997).*

(Continued)

*Primary Examiner* — Lily C Garner
(74) *Attorney, Agent, or Firm* — Bodi Law LLC

(57) ABSTRACT

A nuclear reactor adapted for generating energy and/or decontaminating nuclear fuel using a plurality of energy beam generating accelerator devices configured for inducing a photo-fission reaction in the nuclear fuel.

16 Claims, 12 Drawing Sheets

(56) References Cited

U.S. PATENT DOCUMENTS

2005/0013397 A1 1/2005 Csom et al.
2010/0316176 A1* 12/2010 Wood .................. G21G 1/10
376/190
2016/0293279 A1* 10/2016 Stuart .................. G21G 4/06

FOREIGN PATENT DOCUMENTS

WO   WO-0072329 A2 * 11/2000 ............. G21G 1/12
WO       0167464 A1    9/2001

OTHER PUBLICATIONS

European Organization for Nuclear Research; CERN/AT/95-44 (ET); Conceptual Design of a Fast Neutron Operated High Power Energy Amplifier; C. Rubbia, J.A. Rubio, S. Buono, F. Carminati, N. Fietier, J. Galvez, C. Geles, Y. Kadi, R. Klapisch, P. Mandrillon, J.P. Revel and Ch. Roche; Geneva, Sep. 29, 1995; 241 pages.
PCT International Search Report; Date of Actual Completion of International Search: Sep. 23, 2015; International Search Report: dated Oct. 22, 2015.

\* cited by examiner

METHOD AND SYSTEM FOR GENERATING ELECTRICITY USING WASTE NUCLEAR FUEL

CROSS-REFERENCES TO RELATED APPLICATIONS

This application is the national phase of International Application No. PCT/US2015/012386 filed on Jan. 22, 2015, which claims the benefit of priority from U.S. provisional application Ser. No. 61/930,027 filed on Jan. 22, 2014, the entire disclosures of which are incorporated herein by reference.

BACKGROUND

Spent nuclear fuel that has been used in commercial nuclear reactors actually has a large amount of potential energy that is just waiting to be harvested while simultaneously dealing with the problem of the dangerous radioactivity level of that "waste" fuel. However, since in a traditional nuclear reactor process only 4% of the original fuel load has typically been consumed, the radioactive decomposition of the constituents of the spent fuel (assumed to be radioactive "waste" under current processes) tends to be slow and hence is not harnessed for energy production. But because the half-life of these "waste" radioactive components is not short, the fuel must be stored for very long periods in a manner to protect the public from these radioactive byproducts of the energy producing nuclear reactors.

Currently, the spent nuclear fuel and its byproducts tend to be stored on the site of the nuclear plants, in a heat-absorbing manner such as in a water filled "pond", for example, that was designed to be used temporarily. Originally it was intended that a central repository be found for storing such nuclear waste for the long term (i.e., thousands of years), but such central storage has proven to be a political mine-field, with the NIMBI effect leading to no acceptable storage location being implemented. Hence, the spent fuel languishes in the "temporary" storage facilities with no foreseeable solution. But such spent fuel actually provides a large opportunity to further generate electricity if an effective and efficient means of tapping into the remaining radioactive potential energy can be found.

Dielectric wall accelerators are known that can be used to generate useful gamma rays. Such accelerators can provide energy or particle beams of very high energy densities that can impact nuclear reactions in radioactive substances. Generally, however, the practical use of such devices is lacking.

Hence, since the nuclear electrical generation industry has had a problem maximizing the extraction of energy from the nuclear fuel used in nuclear reactors, and has had difficulty satisfactorily disposing of spent fuel rods and other byproducts of nuclear reactors, which contain large amounts of potential energy that is not being utilized along with dangerous levels of radioactivity that can be dangerous if not properly handled or disposed of, a means of solving this problem using energy beams is desirable.

SUMMARY

Provided are a plurality of example embodiments of nuclear reactors useful for generating electricity that use accelerator devices for generating high-energy beams to trigger photo-fission reactions in nuclear fuel. Also provided are embodiments that can drastically reduce or eliminate residual radioactive components of spent fuel for more effective disposal.

Provided is a system of one or more nuclear reactors comprising: a radioactive fuel source; an emitter device configured to generate an energy beam directed at the radioactive fuel source to induce a photo-fission reaction in the fuel source; at least one containment system for containing the radioactive fuel source; at least one heat extraction system configured to extract heat from the system for performing useful work; and a neutron control system configured for controlling neutrons emitted by the radioactive fuel source for controlling a neutron fission reaction in the fuel source.

Also provided is a nuclear reactor comprising: a radioactive fuel source; at least one containment system for containing the radioactive fuel source; an emitter device configured to generate an energy beam directed at the radioactive fuel source to induce a photo-fission reaction in the fuel source; a control system for modifying the energy beam by controlling the emitter device; at least one heat extraction system configured to extract heat from the system for transmission outside of one or more of the reactors; and a neutron control system configured for controlling neutrons emitted by the radioactive fuel source for controlling a neutron fission reaction in the fuel source.

Any of the reactors described herein can be configured to utilize the fuel source both to generate a neutron fission reaction controlled by the neutron control system to generate heat, and also to generate a photo-fission reaction controlled by controlling the emitter device to also generate heat.

Further provided is a method of decontaminating nuclear fuel that is at least partially depleted using a reactors or system such as described herein, with the method comprising the step of performing photo-fission on the nuclear fuel for a period of time.

Also provided is a method of retrofitting a nuclear reactor comprising the steps of:
providing a nuclear reactor including radioactive fuel installed in a reactor core, the reactor designed to generate heat by controlling a neutron fission process; and
subsequent to operating a neutron fission process in the nuclear reactor, installing a plurality of emitter devices each configured to generate an energy beam impinging on the reactor core to induce a photo-fission reaction in the fuel.

Further provided are any of the above methods, further comprising the step of installing additional shielding in the nuclear reactor to absorb portions of the energy beam not absorbed by the reactor core or the fuel.

Further provided are any of the above methods, further comprising the step of extracting heat from the nuclear reactor during the photo-fission process to perform useful work.

Further provided are any of the above methods, further comprising the step of, after at least partially depleting the fuel using neutron fission, at least partially decontaminating the fuel using the photo-fission process over a period of time.

Also provided is a method of decontaminating nuclear fuel that is at least partially depleted, the method comprising the step of performing a photo-fission process on the nuclear fuel that has been at least partially depleted by use in a nuclear reactor for generating energy, the photo-fission process using a an emitter device configured to emit an energy beam directed at the nuclear fuel.

Also provided are any of the above approaches, wherein the emitter device comprises: a source of charged particles; a conduit; a plurality of capacitor elements stacked to form a capacitor array configured to accelerate the charged particles through the conduit which is formed through the capacitor array, each one of the capacitor elements utilizing a pair of electrodes having a layer including diamond or diamond-like carbon, and a plurality of photo switches each including a diamond crystal and being uniformly arranged around the capacitor element for activation during a discharge of the capacitor element; and a cooling system for circulating a coolant in the device for cooling the device. The emitter device is adapted to emit an energy beam including gamma rays as a result of accelerating the charged particles.

Generally, a power generation system (such as any of the above systems) is provided with a reactor that includes at least one reactor core loaded with at least partially spent fuel and arranged with one or more accelerators for generating an energy beam such as a beam of gamma rays for inducing a photo-fission reaction in the fuel, a containment vessel adapted for absorbing excess gamma rays and radioactivity, and a coolant system for capturing the heat generated by the photo-fission reaction.

The above approaches may further include a control system for controlling the photo-fission reaction by controlling the energy beam output of the accelerator(s).

Any of the above approaches may also include devices and/or methods for supporting loading and removing the fuel or spent fuel for the reactor, including a process where only a portion of the fuel is replaced at any given time (e.g., ⅓) to support decontamination of the fuel while also generating a sufficient amount of heat to generate useful work.

Any of the above or below approaches may be further adapted to further deplete the radioactivity content of the spent fuel even after the spent fuel can no longer generate useful heat in the reactor.

Any of the above approaches may be further adapted for disposing of the spent fuel after it has been used in the reactor.

Alternatively, any of the above approaches might be adapted to also provide neutron fission reactions for generating additional useful heat using new fuel rather than spent fuel.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Figure 1:
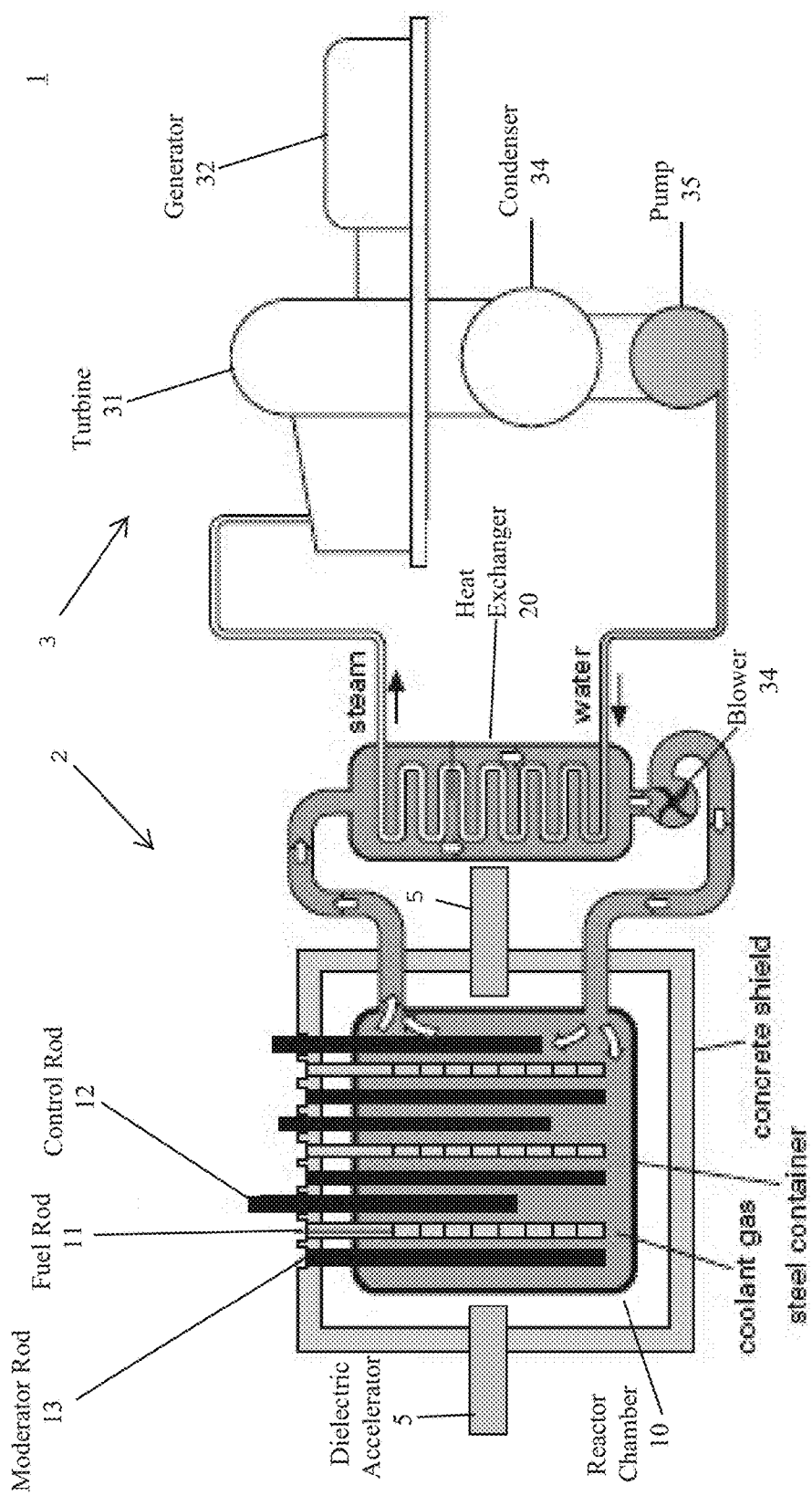
FIG. 1 is a schematic drawing of a first example reactor adding one or more accelerators to supplement the reaction.

Examples of dielectric accelerators that can generate useful energy beams for supporting nuclear reactions discussed herein are discussed in PCT Patent Applications Serial Number PCT/US14/66803 filed on Nov. 21, 2014, and PCT/US14/38386 filed on May 16, 2014, both incorporated herein by reference. These applications specifically discuss example Diamond Dielectric Wall Accelerators (DDWA), but other types of accelerators that generate the desired output energy beams could also be utilized for the applications discussed herein.

A new solution to the problem of better utilizing the energy of nuclear fuels in new or existing reactor facilities is provided by the disclosed method and design discussed herein by, for example, adapting current nuclear power technologies for extended use or configuring new reactors and new facilities to support the new technologies. The problem of nuclear waste can also be mitigated by using the disclosed techniques to decontaminate nuclear fuel.

Radioactive fuel, whether spent, partially spent, or new, can be harnessed for further energy production by inducing the decomposition of the radioactive materials in the nuclear fuel by bombarding the fuel with energy that can be used to accelerate the normal radioactive decomposition process through the process of photo-fission. This can be accomplished, for example, through the use of energy beams emitted by a dielectric accelerator, such as a diamond film dielectric wall accelerator as disclosed in the referenced applications, among others. Essentially, in addition to normal radioactive decay and, in some cases in addition to neutron fission or spallation fission reactions, at least part of the fuel (which may include radioactive decomposition products) is induced to undergo nuclear decay using a photo-fission process by bombarding the spent fuel with gamma rays, proton beams, alpha particles, or other energetic particles contained in one or more energy beams to induce the radioactive isotopes in the spent fuel to spontaneously decompose while releasing heat energy which can be harnessed for electrical power generation, while resulting in waste materials that are far less radioactive, and hence less dangerous and more easily disposed, remaining behind. The energy beams used to induce the photo-fission reaction can, for example, be on the order of tens of MeV, an amount that can be achieved using the referenced accelerators.

A primary advantage of the approach disclosed herein is that a ready supply of spent or partially spent fuel exists at locations already dedicated to electrical power generation using nuclear reactions, thereby leading to economies of scale, and less of a problem of permitting when extending the sites to include photo-fission capabilities, since the locations are already approved for nuclear power generation and waste storage. Furthermore, these disclosed approaches can help avoid the need of transporting the highly radioactive spent fuel any great distance, avoiding the potential problems that are raised by long distance transport of radioactive waste.

Generally, the concept is that the nuclear fuel (which may be new, spent, or partially spent) is arranged in a reactor structure capable of harnessing heat generated by the photo-fission process (exclusively, or in addition to other reactions). For example, such a reactor can be a traditional nuclear reactor that was designed to be used to generate electricity through the use of neutron fission of uranium or plutonium, for example, that has been retrofitted to include photo-fission capability, or it may be accomplished using a dedicated reactor that is primarily or exclusively devoted to photo-fission reactions. To implement the new process, the fuel to undergo photo-fission (new or spent) is bombarded by the energy beams generated from a plurality of accelerator devices, thereby triggering the controlled radioactive decomposition of the fuel materials, which may include original fuel and fuel decomposition products, via a photo-fission reaction. Accelerators such as disclosed in PCT Patent Applications Serial Number PCT/US14/66803 filed on Nov. 21, 2014, and PCT/US14/38386 filed on May 16, 2014, incorporated herein by reference, could be utilized for this process.

A reactor device for using this approach can be made similar or identical to the types of reactors used for originally harnessing energy from the nuclear fuel, except that if designed fresh, much of the safety equipment that is typically used to avoid run-away nuclear reaction in a conventional reactor would not be necessary, because the photo-fission reaction induced by the energy beam can be designed as a fail-safe reaction, in that a melt-down incident cannot occur because the radioactive process will fade away once the energy beams from the accelerators is interrupted. Because the amount of heat to be removed is not excessive, such cooling can be accomplished in a much simpler manner than is used for current nuclear reactors, and even passive cooling systems could be utilized. All that is may be needed is that waste heat continue to be removed for some relatively short period after the energy beams are turned off to allow the fuel to cool down safely, but even the lack of such cooling cannot lead to an actual meltdown event.

For example, a vertical cylinder used as a reactor containment vessel utilizes the passively circulated 400 tonne lead coolant that doubles as the shield. In practice after a beam trip or failure the lead will continue to be liquid for up to two weeks and continue to circulate passively during this time. But even if such cooling is interrupted, damage would be limited to the reactor itself and not to any surrounding areas as the generated heat will not be excessive.

However, one primary benefit of many of the examples disclosed herein is that current nuclear reactors that were designed for neutron fission processes using active cooling can be adapted (i.e., retrofitted) for using the disclosed accelerators to supplement, or extend, the nuclear reactions of current nuclear reactors, leading to additional energy capture from the traditional fuel sources and leading to a reduction in the radioactivity levels and dangerousness of the resulting nuclear waste. Such retrofitting can use both neutron fission and photo-fission reactions, either in series, or simultaneously, to further utilized the potential energy of the fuel sources, while resulting in spent fuel that is less radioactive than in the convention process of relying solely on neutron fission reactions.

Furthermore, alternative reactor designs can also be utilized focused solely on photo-fission reactions. The methodology provides the benefit that such reactors are greatly simplified over the reactors used for conventional nuclear reactors.

Example System Designs

FIG. 1 is a schematic diagram showing a nuclear reactor power generation plant 1 that is modified to include accelerators 5 for including photo-fission capabilities at the plant. A nuclear reactor 2 is comprised of a reactor chamber 10 comprising a core having a steel container for containing a coolant (gas or liquid) and for housing fuel rods 11, control rods 12, and moderator rods 13 that might be used in a traditional manner to support neutron fission reactions. This reactor heats the blower 34 driven coolant through, in this example, a heat exchanger 20 which transfers energy to a water-based system to create steam which is circulated through an electrical generation subsystem 3 having a turbine 31, electrical generator 32, and condenser 34, and pump 35, all of which can be operated in a conventional manner.

The conventional design is modified, however, by the addition of a plurality of the dielectric accelerators 5 that bombard the reactor chamber 10 with energy beams configured for causing additional spontaneous nuclear decay (i.e., photo-fission) in the radioactive fuel(s) comprising the fuel rods 11. Through the use of these accelerators 5, the fuel and its byproducts may remain in the reactor for a longer period than in conventional operation, while still continuing to generate sufficient heat energy to generate the desired electrical power. Hence, even as the neutron fission of the fuel decreases due to depletion of the fissionable fuel, further heat can be generated by the photo-fission decomposition of the remaining fuel and its radioactive byproducts that is induced by the energy beams generated by the accelerators 5, making up for the reduction in neutron fission that occurs over time. Hence, the heat generated by the photo-fission of the fuel and radioactive fuel by-products that are induced by those energy beams supplements energy extraction from the fuel, while also reducing the residual radioactivity of the remaining byproducts.

Figure 2:
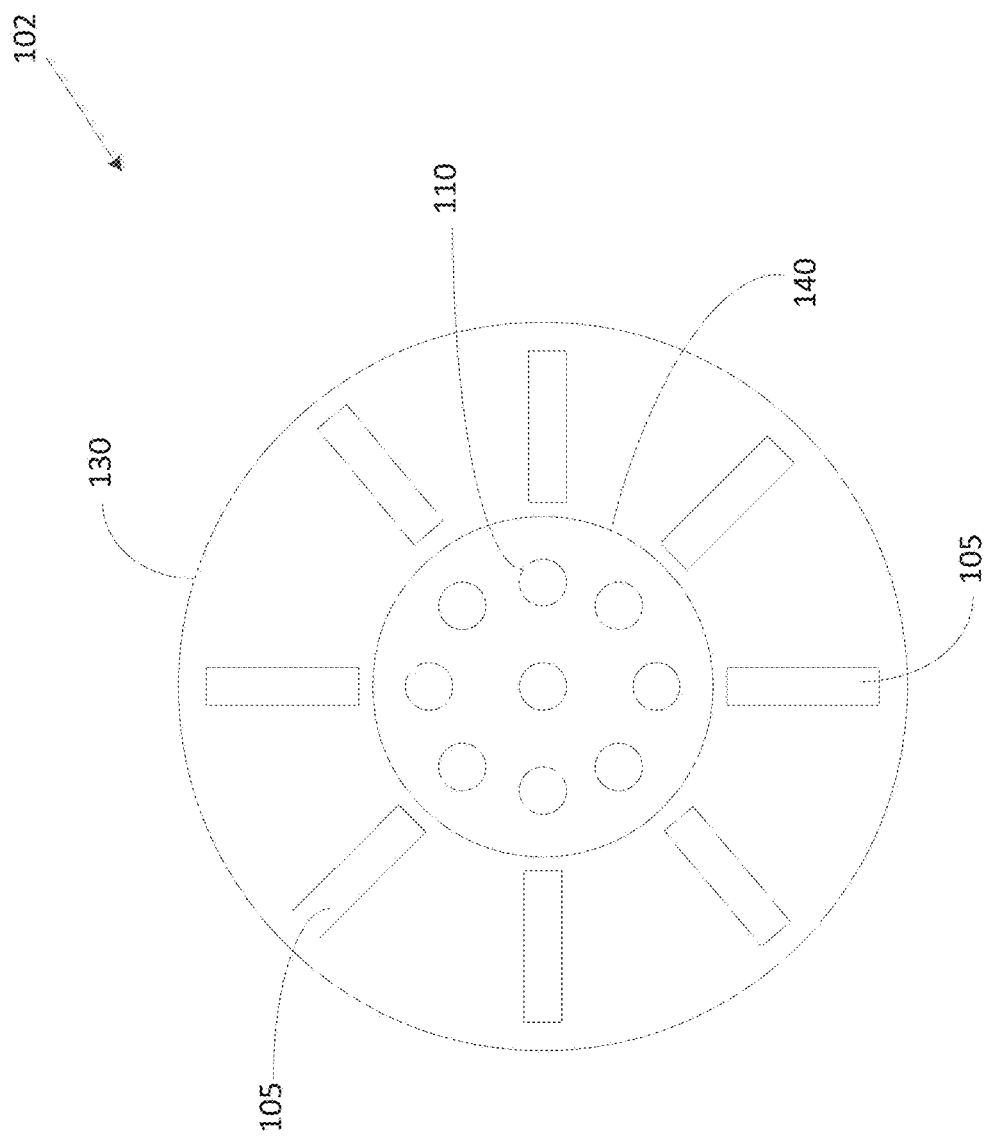
FIG. 2 is a schematic block drawing of a first example reactor adapted to utilize photo-fission reactions.

FIG. 2 is a schematic block diagram showing a fission reactor design 102 that can utilized photo-fission reactions. The reactor is provided with a central core 140 which provides a fuel holding structure for holding the reactor fuel 110 and a means for circulating a desired coolant (not shown) for capturing the heat generated by the fission reaction (and which will also capture the heat generated by the energy-beam induced decomposition as well). Optional control structures for controlling the rate of neutron fission (when utilized) and control structures for controlling the photo-fission reaction are not shown. A plurality of accelerators 105 are shown surrounding the central core 140 placed within the containment vessel 130, although arrangements where accelerators 105 are provided only partially surrounding the central core 140 may also be provided (e.g., see below), and in fact such arrangements may be preferred to reduce the requirement for shielding from the energy beams generated by the accelerators 105. The containment vessel 130 is provided surrounding the reactor components to protect the environment from both the radioactivity of the fuel and spent fuel, and to absorb any neutrons and any part of the energy beam generated by the accelerators 105 that is scattered or otherwise not absorbed by the reactor core.

For this example approach, the accelerators 105 (which may include any of the DDWA devices discussed herein, among others) provide the energy or particle beams ("energy beams"), such as of gamma rays, which are at least partially absorbed by the reactor fuel 110 for inducing a photo-fission reaction in the fuel and fuel byproducts and thereby generating useful heat.

Note that the photo-fission reaction may be used in conjunction with a neutron fission reaction that is traditionally used in commercial nuclear reactors, except that the addition of the photo-fission reaction allows for power generation for much longer periods. This is particularly the case when existing reactors are retrofitted with the accelerators as described herein.

Alternatively, the reactor may rely exclusively on photo-fission reactions, or it may use a spallation reaction along with photo-fission. This may be the case where an additional reactor is to be built at a site having conventional nuclear reactors, with the new reactor being provided for the purpose of at least partially decontaminated spent fuel while generating electrical energy, e.g., to supplement the nuclear process of existing nuclear reactors.

Figure 3:
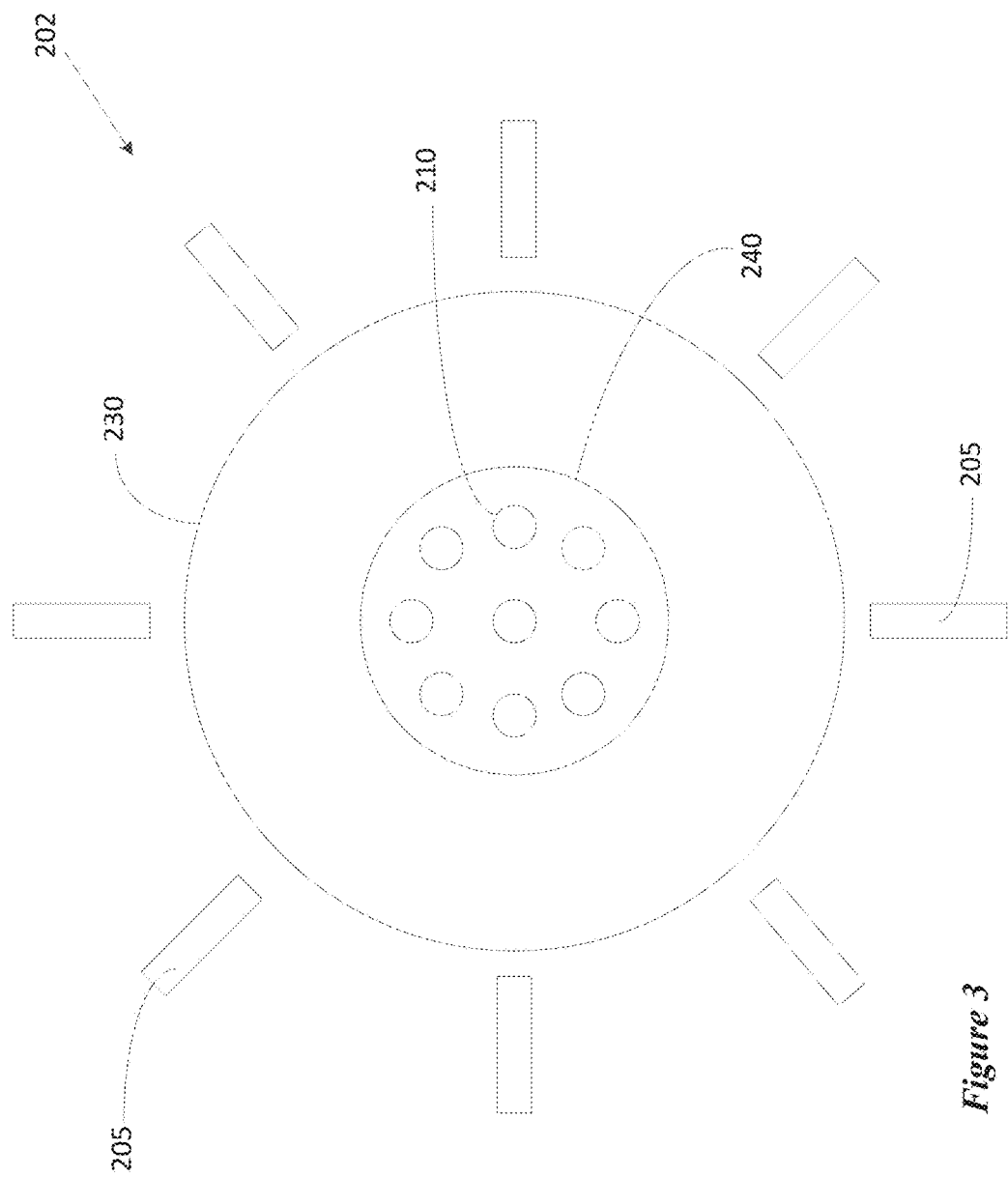
FIG. 3 is a schematic block drawing of a second example reactor adapted to utilize photo-fission reactions.

FIG. 3 is a schematic drawing of an alternative photo-fission reactor design 202 where the accelerators 205 are provided outside of the containment vessel 230, but driven with sufficient energy to penetrate the vessel 230 so as to bombard the reactor core 240 with the energy beam to induce the photo-fission reaction in the fuel 210. This solution may not be ideal where the containment vessel 230 absorbs much of the energy beam before it can reach the core 240.

Figure 4:
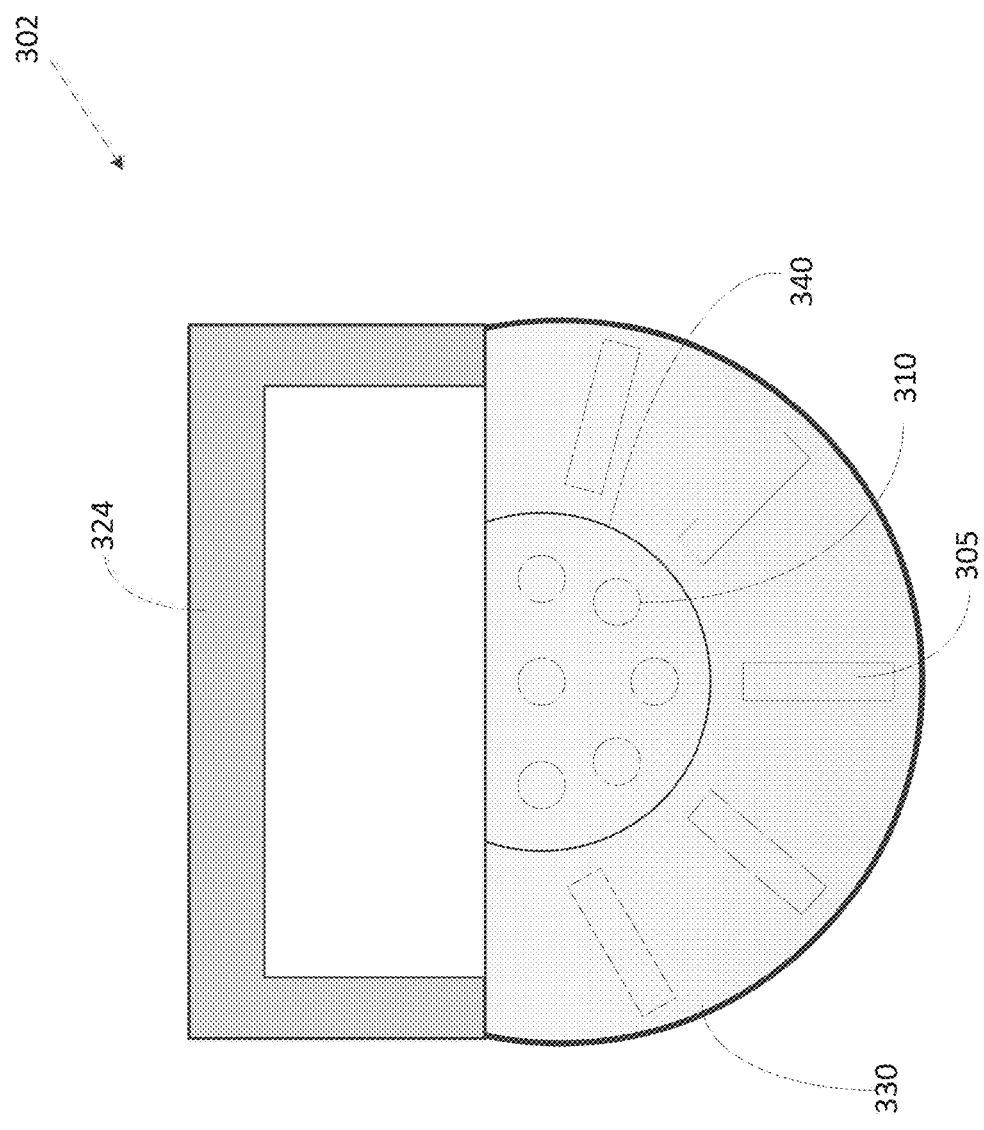
FIG. 4 is a schematic block drawing of a third example reactor adapted to utilize photo-fission reactions.

FIG. 4 is a schematic drawing of an alternative fission reactor design 302 where a central core 340 is provided with nuclear fuel 310 where the accelerators 305 are provided only partially around the core 340. The reactor includes a dense shield wall 324 as a containment vessel constructed of a material to absorb portions of the energy beam from the accelerators 305 that are not absorbed by the central core 340, in addition to providing shielding for any neutron activity and other radioactive processes. A less dense portion 330 of the vessel can be provided in areas where only minimal absorption of the energy beams is required, but where radiation protection is still needed (this may be comprised of the original containment structure of a retrofitted reactor). Note that by use of the term "dense portion" it is not necessarily implied that that portion is "thicker" or materially more dense than the "less dense portion", but that the "dense portion" is of a composition and/or structural design that better absorbs stray portions of the accelerator beams. Coolant channels (not shown) for circulating coolant through the core 340 for capturing the heat generated by the neutron and photo-fission reactions are provided as needed.

Generally, the above approaches may be utilized to retrofit conventional, pre-existing (or new) nuclear reactors in order to extend the power generation period for a given fuel charge. For retrofit applications, the chosen installation locations for the accelerators will depend on where sufficient space is available, and it will also depend on the existing shielding that is available. Examples are provided below for supplementing the shielding to absorb stray energy beams emitted by the accelerators.

As an alternative, the above designs could be custom-built systems, such that the central cores of the proposed designs can be structured similar to that of conventional reactors (by utilizing neutron fission), or they can be designed for optimal use primarily for a photo-fission reaction for the purpose of generating electricity using spent nuclear fuel obtained as waste from other nuclear plants to further capture energy of the fuel and to reduce the fuel radioactivity prior to disposal and storage. As such, new photo-fission reactors could be provided at existing nuclear sites for additional power generation and waste decontamination. Generally, the core material of such reactors should be chosen to withstand the waste radioactivity of spent fuel and its potential byproducts, and it should be designed to withstand the constant bombardment of the accelerator beams (typically gamma rays). Such cores may be made of metals, such as zirconium alloys, which have proven durable for reactor core use. Stainless steel may also be used. Ceramic or concrete or lead cores or combinations thereof may also be utilized. Heavy water or other radiation absorbing materials might also be utilized, as desired.

The typical control structure that shields or otherwise controls the exposure of the reactor fuel to neutrons generated by the fuel itself is mitigated or eliminated in newly designed reactors disclosed herein, because the photo-fission process need not rely on neutrons for maintaining the nuclear fission reaction. In fact, it will likely be most beneficial in new designs to arrange the fuel to avoid or minimize such neutron interaction, as this can improve the controllability of the reaction using the accelerators and reduce the risk of melt-down accidents. If sufficiently arranged, and/or with the reactor core comprising proper materials for absorbing or reflecting stray neutrons, the contribution of neutrons to the fission reaction will be negligible.

Accordingly, in many circumstances and in particular for new designs, the reactor core will be provided with neutron-absorbing and reflecting materials such as graphite, lead, boron, silver, indium, xenon, cadmium, hafnium, gadolinium, cobalt, samarium, titanium, dysprosium, erbium, europium, molybdenum and/or ytterbium. Other means of absorbing neutrons could also be used, such as by using heavy water as the coolant, for example. But because there is little or no desire to control the flow of neutrons for reactor control, these materials can be statically arranged in the core, rather than dynamically arranged as in current reactor design (e.g., such as through use of control rods, or fuel positioning, for example). Hence, the core may be designed of an alloy with good neutron absorbing properties while also exhibiting good radiation durability.

The containment vessels or other containment vessels may also be provided in a manner similar to conventional nuclear reactors, by using such materials as concrete and/or stainless steel, for example. For this structure, particular attention should be given to absorbing any stray accelerator beams to prevent such beams from escaping beyond the reactor; as such beams can be harmful to living creatures and external structures.

Retrofitting Designs

As discussed above, current nuclear reactors could be modified to utilize dielectric accelerators for extending the lifetime of nuclear fuel loads in existing reactors.

The approach of FIG. 4, described above, can be used to retrofit an existing nuclear reactor by providing the dense shield wall 324 as an added component of an existing reactor, when needed, to increase the energy beam shielding capability, such as to add additional gamma ray absorption capabilities when the original shielding might prove insufficient.

Figure 5:
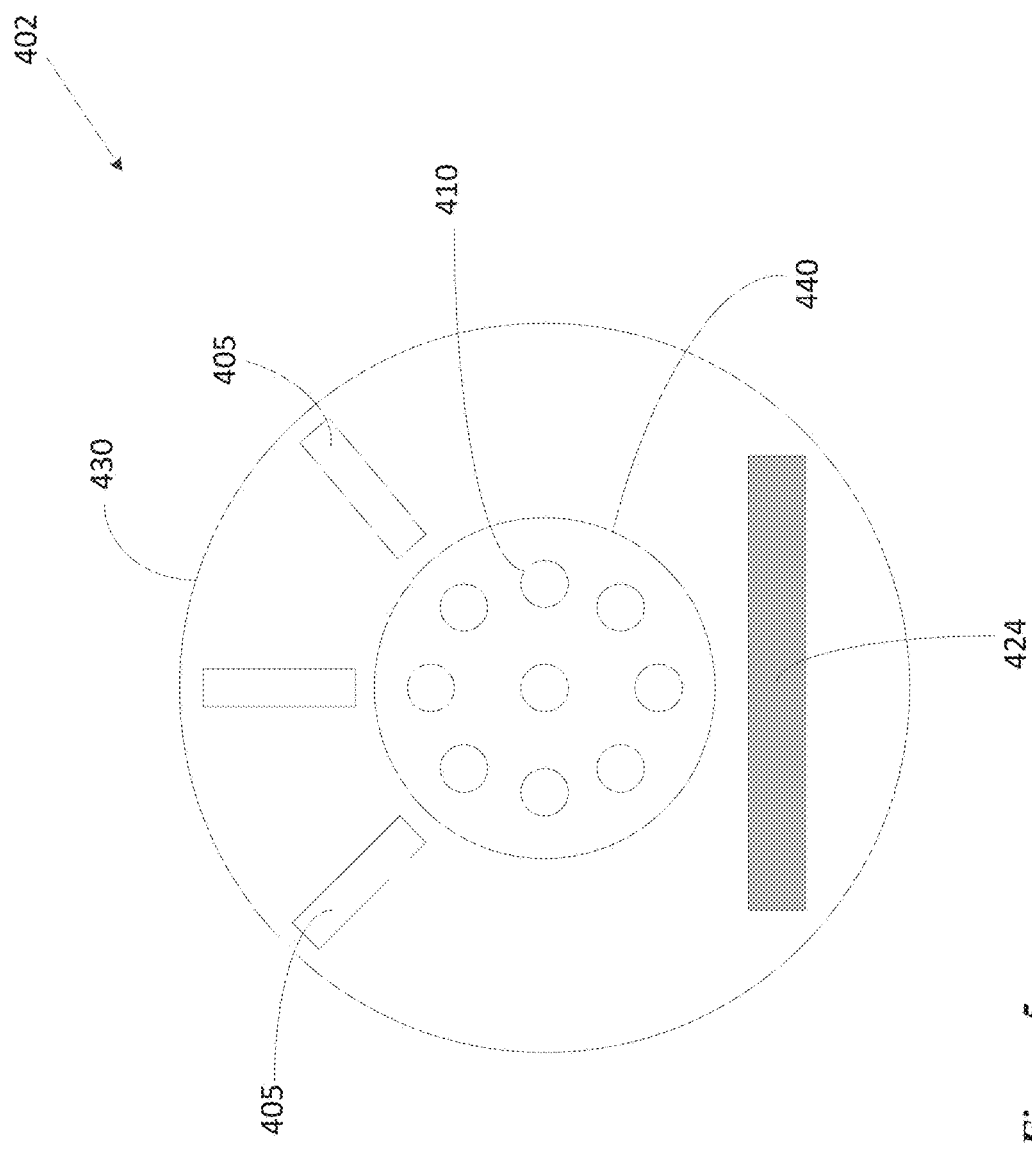
FIG. 5 is a schematic block drawing of a fourth example reactor adapted to utilize photo-fission reactions.

FIG. 5 shows a simplified schematic diagram of an example retrofit design. In this case, the conventional reactor core 440 with fuel 410, which may include new, spent, or partially spent fuel, is surrounded by a plurality of accelerators 405, and additional shielding 424 can be provided within the reactor containment wall 450, when desired, to absorb stray energy beams (e.g., gamma rays) emitted by the accelerators 405. Note that the control circuitry and much of the additions support equipment are not shown in this diagram. In some situations, accelerators may be provided at other locations, such as outside or on the containment walls, mounted on the reactor above, around, or buried under the reactor, or provided in some other location. For such circumstances, the power levels of the accelerator beams may need to be greatly increased in order to ensure penetration of existing reactor shielding or other structures to ensure penetration to the nuclear fuel sufficient to trigger photo-fission. In particular, mounting the accelerators such that their beams are directed downward, where the floors and ground can provide additional shielding, may prove advantageous.

Figure 6:
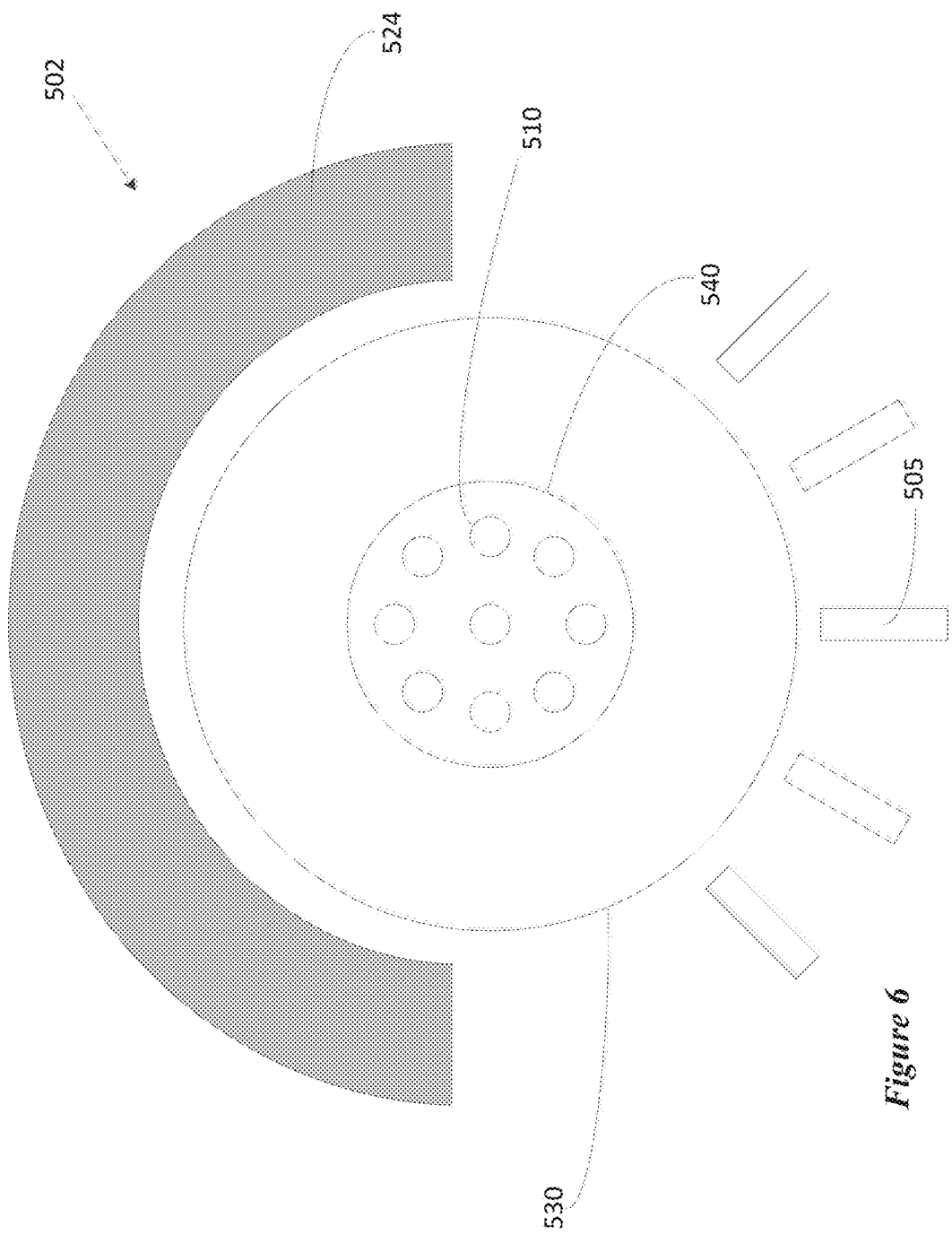
FIG. 6 is a schematic block drawing of a fifth example reactor adapted to utilize photo-fission reactions.

FIG. 6 shows a simplified schematic diagram of an example retrofit design where the accelerators 505 are provided outside of an existing containment structure 530 housing the conventional reactor core 540 with fuel 510, which may include spent or partially spent fuel. Additional shielding wall 524 can be provided outside of the conventional reactor containment wall 530. Note that the control circuitry and much of the additions support equipment are not shown in this example, either.

Finally, it is noted that these concepts directed at retrofitting existing designs might also be utilized in constructing new reactors. For example, reactor designs that are already approved via a regulatory process might be more easily approved with additions (such as additional shielding and the addition of the accelerators), than entirely new designs. Also, such designs may prove advantageous in situations where both photo-fission and neutron fission reactions are to be utilized.

Additional Designs

Figure 7:
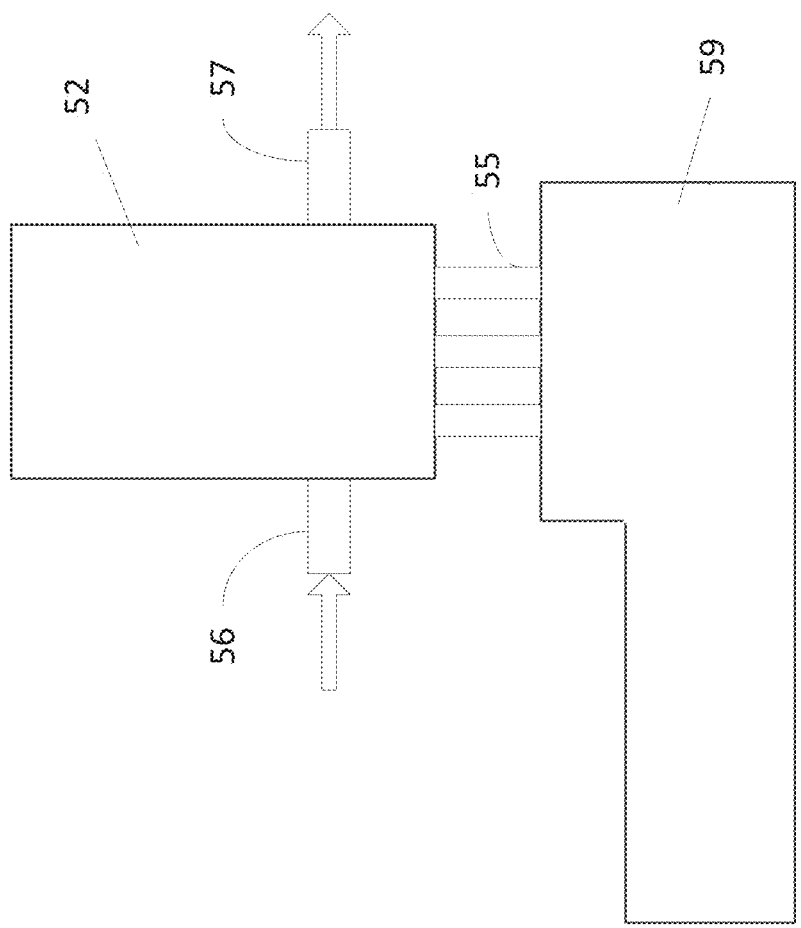
FIG. 7 is a schematic drawing of an example of a reactor configured to utilize photo-fission reactions adapted for replacing spent fuel.

FIG. 7 is a block diagram of a potential modification of an new or existing convention reactor design modified to support utilization of spent fuel using a fuel replacement arrangement 59 to replace fuel (new or spent) via paths 55 to supply fuel to a central core 52. Also shown are coolant input port 56 and coolant output port 57 for circulating coolant in the central core to capture the useful heat while cooling the core.

Any of these, or alternative, reactors could be designed that would utilize new or spent fuel rods, new or spent fuel pellets, pebbles, or any other type of reactor fuel. Fuels that are arranged as oxides, ceramics, metals, salts, or other compositions could be supported. Typically, the fuel, over time, will be comprised of many different fission products, along with remnants of the original fuel, in particular where spent fuel is a primary fuel source.

The reactors would, in most circumstances, be designed to utilize one particular type of fuel, although designs that could accommodate more than one type of fuel are also contemplated. For example, a reactor that utilized new fuel for neutron fission reactions might also accept some spent fuel for decontamination purposes, along with extraction of remaining energy using photo-fission as well.

Generally, because it is likely that these reactors will be provided in locations where a particular type of fuel is stored, in retrofitting operations the reactor designs for that location, even when new reactors for photo-fission and decontamination are built, would preferentially utilize that type of spent fuel already present in that location.

Other reactor designs can also be utilized to generate the desired heat for performing useful work while also reducing the radioactivity of the fuel for easier disposal. Furthermore, pressure vessels, radiation shielding, moderators, control rods, charge tubes, or other components can be added as desired where their functions are desired, using known techniques and designs.

However, in the case of building new reactors solely dedicated to photo-fission reactions, it is anticipated that for most practical applications, no control rods should be needed, and the need for features such as moderators or other control devices will likely be reduced or even eliminated due to the inherently more controlled reaction provided by the disclosed approaches.

Figure 8:
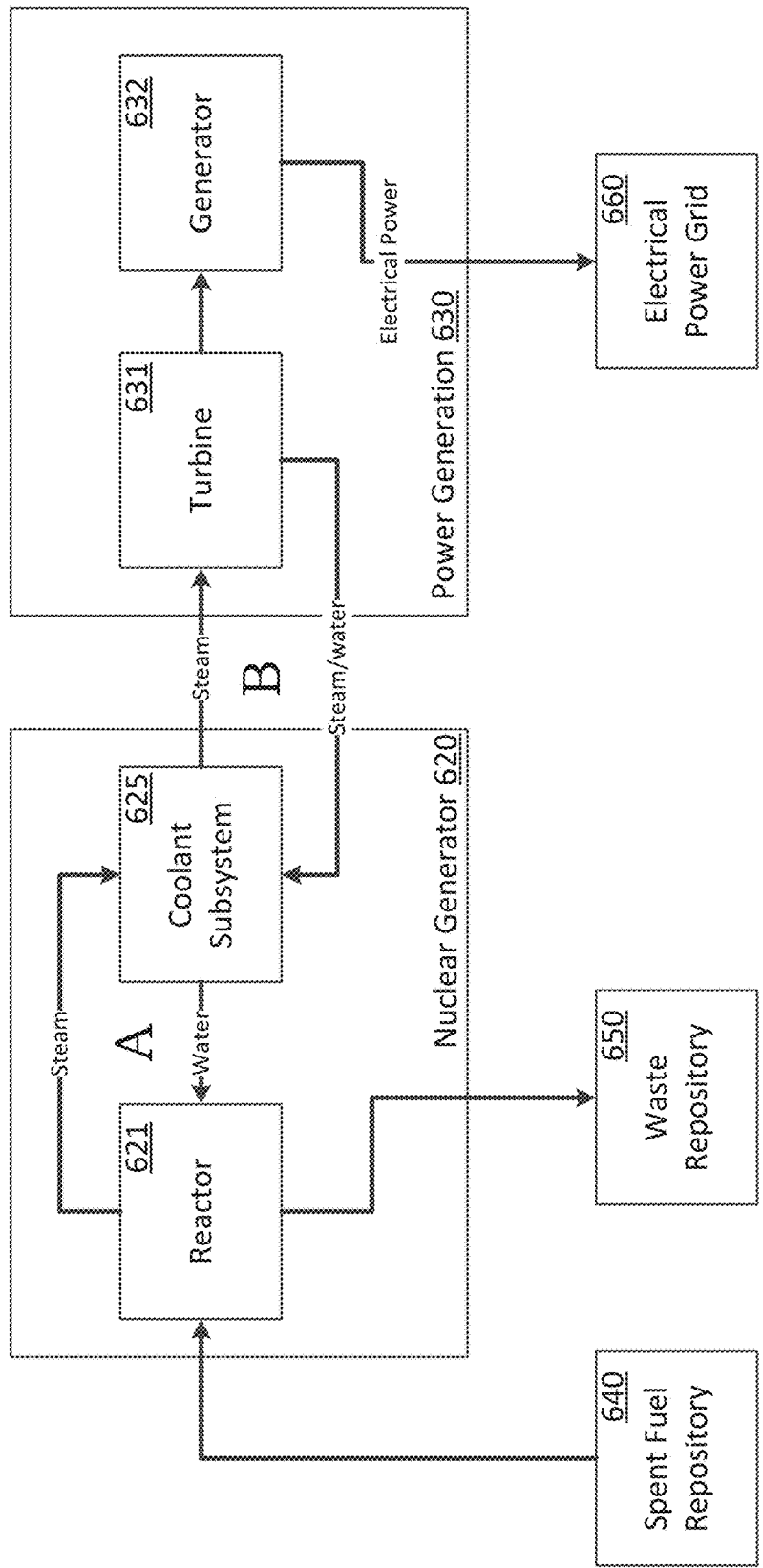
FIG. 8 is a block diagram of an example photo-fission reactor electrical generation plant.

FIG. 8 is a block diagram of one arrangement for utilizing a photo-fission reactor system 620 as disclosed herein for generating electricity. The chosen reactor 621 would provide coolant to a coolant subsystem 625 which will likely include one or more pumps, piping, heat exchangers, etc. in a manner similar to existing power generating plants (see, e.g., FIG. 1). Generally, such a subsystem 625 is used to move heat from potentially radioactively contaminated coolant A to an isolated coolant B for providing to an electrical generation subsystem 630 including a turbine 631 and generator 632 for generating electricity, for supplying to an electrical power grid 660, from the collected heat generated by the reactor 620.

If this reactor is built for the purpose of recycling spent nuclear fuel, the reactor 620 will be fed with spent fuel that may be stored locally in a spent fuel repository 640. If a retrofitted reactor approach is used, there may be no need for such a repository or such a need may be reduced, as the original fuel can remain in the reactor long past its traditional replacement period, resulting in a lower radioactive final waste product that is easier to store, transport, and otherwise dispose of.

The waste fuel that remains after it has been utilized by the photo-fission process is then stored in a local waste repository 650 or otherwise disposed of. Such a waste repository 650 will likely need only minor radiation shielding and minimal heat absorption capabilities because the waste fuel will have drastically reduced radioactive materials present, if any. Note that because the photo-fission process can be used to reduce the radioactive components of the spent fuel to near zero if the fuel is bombarded with the accelerator beams beyond the period where useful heat is generated, it is possible to utilize the system to basically decontaminate the spent fuel in the manner discussed in more detail below.

Coolant A and coolant B, although shown as being water/steam in the figure, may have different compositions, and can be chosen from any of the conventional coolant types used by nuclear reactors, such as light or heavy water/steam, although molten metal or molten salt coolants, light gas coolants, or other coolants, could also be utilized. Note that more than one coolant system might be used. For example, one system may be primarily used to retrieve useful heat for power generation, while another system may be provided solely for cooling purposes, such as during emergency shutdowns, for example. It is preferred that any emergency cooling system be a passive system, if feasible, to improve safety.

The electrical generation subsystem 630 may be implemented in a conventional manner. Alternatively, the system 630 may utilize an expander based on an improved oscillating engine, such as the polygon engine disclosed in PCT Patent Application serial number PCT/US2013/036099, filed on Apr. 11, 2013, and incorporated herein by reference, or the oscillating engine as disclosed in PCT Patent Application Serial Number PCT/US11/30322 filed on Mar. 29, 2011, also incorporated herein by reference, for improved efficiencies. Note that the electrical generation subsystem 250 may be the same subsystem used by a conventional reactor located nearby that may have been decommissioned, or that may still be operating.

Finally, as discussed above, a further alternative can be provided for new nuclear plants, or for retrofitting existing plants. In these situations, the nuclear reactor is modified such that it is capable of both conventional neutron fission operation, but with the addition of accelerators in a manner similar to that described above, for adding a photo-fission capability. In such a "combination reactor", retrofitting the reactor to provide the benefits of photo-fission are extended for the conventional reactor. In particular, such a combination operation would be useful for a design that has a fail-safe operation, with the photo-fission reaction providing additional control over the fission operation and fuel decontamination, improving efficiency, and greatly reducing the amount of highly dangerous radioactive waste.

For fail-safe, the control can be set up so that the neutron fission reaction is sufficiently slow so that it is not capable of a melt-down on its own, even with a total loss of control and a total loss of coolant. In such an operation, the neutron reactor is operating below the critical point, and the photo-fission reaction is used to provide a substantial portion of the heat production, and any loss of control will shut down the photo-fission part of the reaction, also reducing the number of neutrons below that needed to sustain the fission reaction above a danger threshold, avoiding meltdown situations.

Example Operating Concepts

In some circumstances the operation of a photo-fission reactor can be made quite different than that of a conventional nuclear reactor, with simplification of such operation possible. Because the photo-fission reaction is basically controlled through the operation of the accelerators by varying the beam intensity, rather than controlling neutron flow between fuel components, the control can be primarily electrical (operating the accelerators), rather than mechanical (through use of control rods or fuel insertion). By varying the intensity of the accelerator beams, the rate of the photo-fission reaction can be controlled without mechanical operation. Furthermore, in some situations neutron flow might also be controlled, such as in a conventional manner (e.g., using control rods) to further control the reaction, such as in situations where the spent fuel actually contains a substantial portion of the original fuel composition remaining, or where a combination plant, as described above, is utilized. Furthermore, where desired, energy beam intensity could be controlled using a mechanical operation, such as by lowering and raising shielding, or even relying to some extend on previously existing control rod operation.

Figure 9:
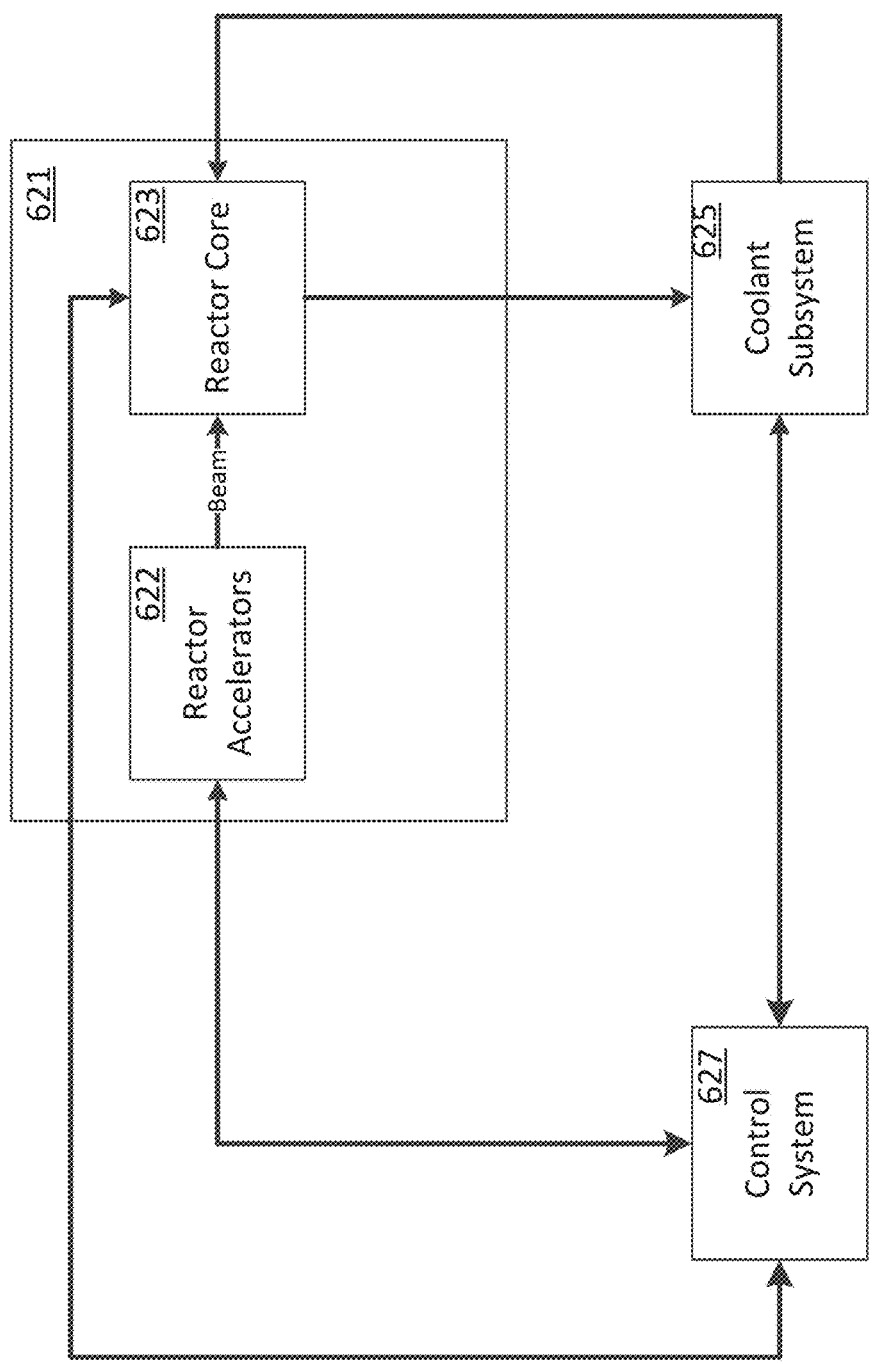
FIG. 9 is a block diagram of an example control configuration of an example photo-fission reactor electrical generation plant.

FIG. 9 shows an example block diagram of one means of controlling the photo-fission reaction of a plant, including plants where neutron fission is minimized or eliminated. In this case, a control system 627 controls the intensity of the accelerator beams generated by the reactor accelerators 622, thereby controlling the rate of the photo-fission reaction in the reactor core 623. The coolant subsystem 625 can also be controlled by the control system 627 to ensure that the reactor core 623 is maintained at a proper temperature. Even when the reactor accelerators 622 are completely turned off to eliminate an accelerator beams, the coolant subsystem 625 may be operated for a period to continue to cool the reactor core 212 to remove heat resulting from residual radioactive decay, which should diminish over time. However, even if the coolant subsystem 625 completely fails, a meltdown of the core 623 is typically not possible because it is unlikely that a run-away reaction can occur in a photo-fission process that does not utilize, or minimizes, neutron fission reactions.

Figure 11:
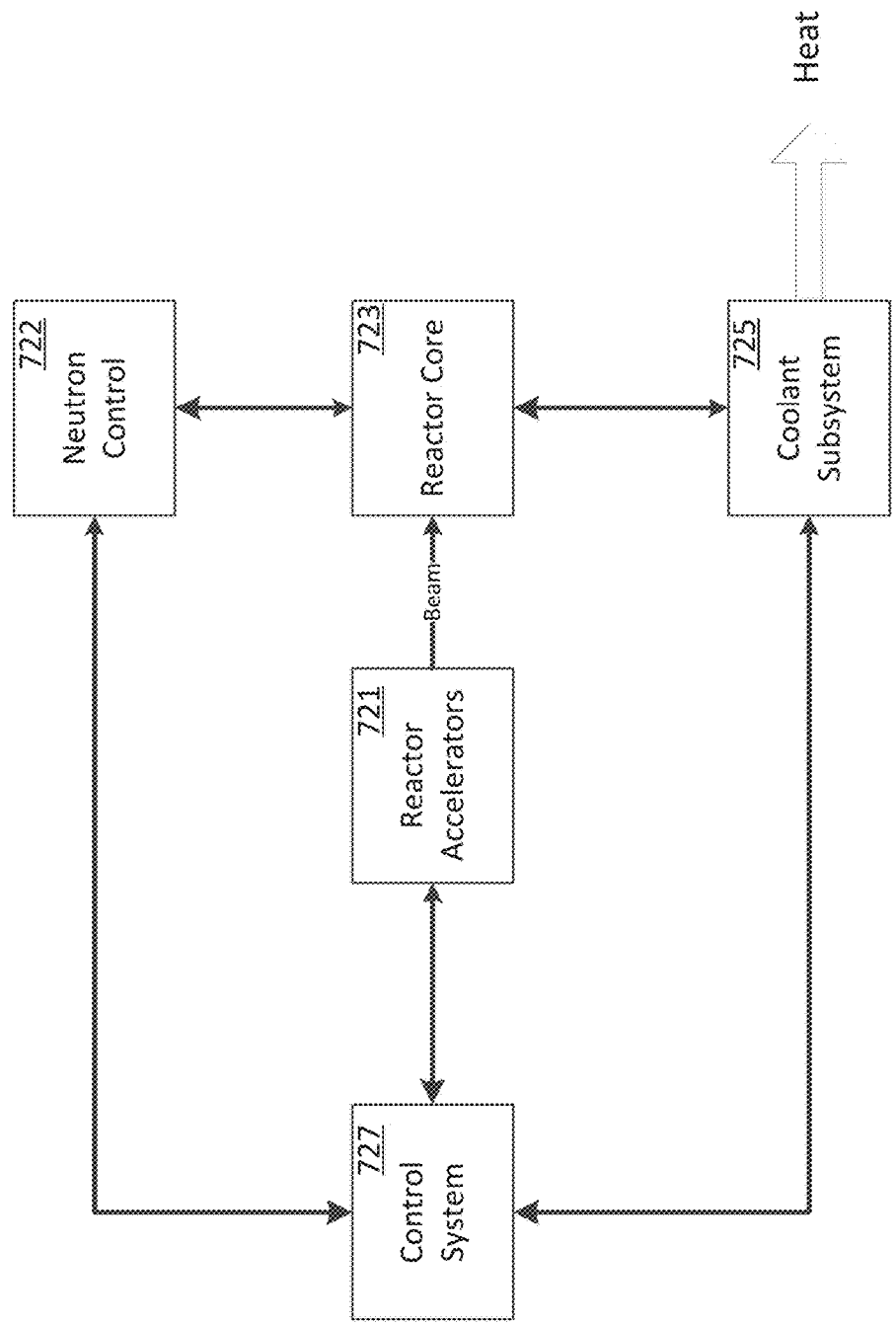
FIG. 11 is a block diagram of an example control configuration of an example combined photo-fission and neutron fission reactor electrical generation plant.

Note that in the case of retrofitting an existing nuclear reactor, or in a reactor that also utilizes neutron fission, the control system 627 may also be used to control the control system of the reactor core 623, such as control of the control rods and fuel insertion, for example, although the control system of FIG. 11 is likely more appropriate.

For example, a plant utilizing photo-fission reactions may be operated in one of at least three different modes. In a first mode, the plant is primarily operated for power generation, and the spent fuel is removed and replaced when the insufficient radioactive materials remain in the fuel to generate sufficient useful heat. In this case, the reaction may be shut down when the fuel is sufficiently depleted, and all of the fuel is replaced at this time. Such an approach might also be used in a retrofitted reactor.

In addition, another mode of plant operation may be primarily used to reduce the radioactive components of the spent fuel to a minimum amount to aid in disposal of the resulting waste, which can be accommodated by this second mode of operation. In this second mode, it will be desirable to leave the spent fuel in the reactor for a much longer period to ensure that the photo-fission reaction has depleted most of the radioactive components of the fuel. For plants to be operated in this manner, the fuel may be only partially replaced at a given time, with some of the spent fuel remaining for decontamination purposes. For such a plant, the reactor core may be designed to hold more fuel than necessary to maintain the desired heat output to support such decontamination.

For example, a reactor core may be designed to hold three times the amount of fuel as necessary to maintain the desired heat generation capability. For such a design, a loading process is followed where ⅓ of the capacity fuel may be loaded, and the plant operated until the fuel has been depleted for energy generation purposed, in which case another ⅓ of the capacity of fuel is loaded with new (or new spent) fuel, with the depleted spent fuel remaining in place, Then, the reactor is operated until the second load of fuel has been depleted, in which case it is allowed to remain while the final ⅓ of fuel is loaded. Now the plant enters normal operation, with the most spent fuel (i.e., oldest ⅓) being replaced with new fuel on each refuel step, with the removed fuel being sufficiently depleted of dangerous radioactive byproducts to be more easily stored or disposed of.

Hence, under normal operation in the above proposed scenario, ⅓ of the loaded spent fuel is used to generate heat, whereas ⅔ of the loaded spent fuel is depleted, but is undergoing continued photo-fission to continue to decompose residual radioactive components. When the most recently loaded batch of spent fuel becomes depleted, then the least recently loaded batch is removed for disposal, and replaced with a new load of spent fuel. This process continues, with the depleted spent fuel that is disposed of having a much lower amount of residual radiation than would occur in the first mode of operation described above.

Of course, rotating the fuel in ⅓ capacity batches is only an example, as batches of other sizes, such as ½, ¼, ⅕, or other size batches could be utilized, with respective modifications of the process being provided.

Alternatively, the plant may initially have the entire core loaded with fuel, but operating at a lower energy beam intensity to generate the desired heat. The beam intensity can increase as the fuel is depleted, to the point where a portion of the fuel need be replaced to ensure continued heat generation. The plant can then be operated with ⅓ newer fuel, and ⅔ older fuel, with another replacement operation used when the current load is sufficiently depleted. However, the disadvantage of this approach is that one or two partial loads of fuel are removed prior to full decontamination, leading to the problem of disposing of that initial fuel load. After the two initial replenishment operations, the reactor could be continually operated as described above for the second mode; at least until a maintenance shutdown is performed.

Although this mode of operation is primarily directed to new reactors performing exclusively photo-fission reactions, in some cases, particularly at time of decommissioning, retrofitted reactors may be run in this mode as well for fuel decontamination purposes.

Finally, in a third mode of operation, a plurality of reactors may be provided at a particular location, with operation of the reactors being modified such that as an extension of the first mode of operation, for any given reactor, the operation is continued to maintain the photo-fission reaction for some time after the loaded fuel has been depleted to reduce the residual radioactive components of the depleted fuel to a desired minimal amount. The use of a plurality of reactors allows the continued generation of power to feed the reaction and maintain energy generation and hence cash flow.

For example, in the case of retrofitted systems, one mode of operation may be an operation that exclusively uses neutron fission, but once the fuel is sufficiently depleted, photo-fission is started (abruptly, or gradually) to continue operation using the same fuel, further depleting the fuel and effectively decontaminating it. Where desired, this operation can continue into a decontamination mode where little or no power is captured, but the photo-fission process is continued to further decontaminate the fuel.

Figure 10:
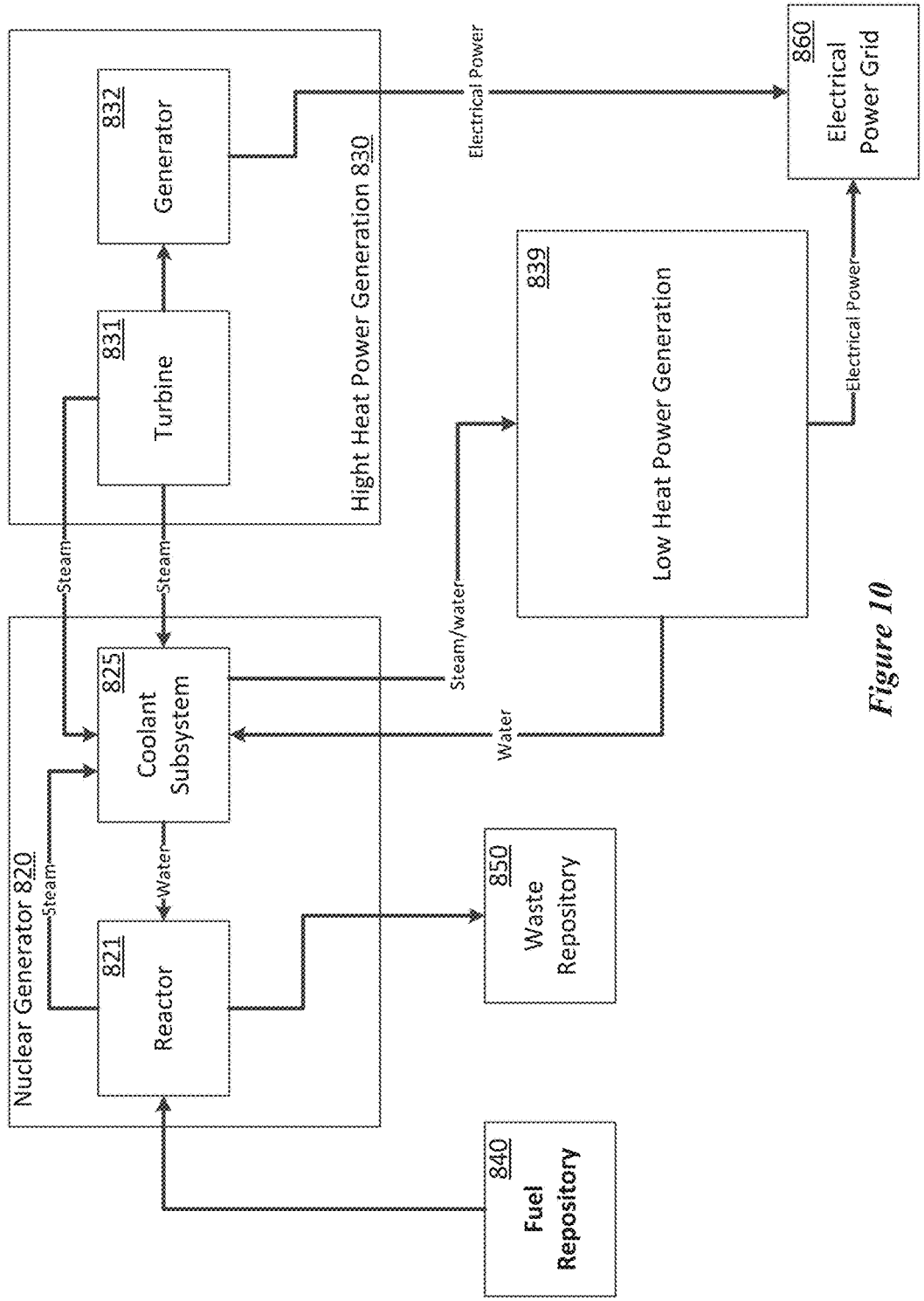
FIG. 10 is a block diagram of an example photo-fission reactor electrical generation plant having both low heat and high heat power generation sub systems.

Alternatively, more energy efficient means may be utilized during such a third mode of operation. For example, in FIG. 10, is a block diagram of one arrangement for using a photo-fission reactor system 820 as disclosed herein for generating electricity. The chosen reactor 821 would provide coolant to a coolant subsystem 825 which will likely include one or more pumps, piping, heat exchangers, etc. in a manner which may be similar to existing power generating plants. However, in this case, the subsystem 825 is configured to supply heat to two different power generation subsystems. The more conventional system is used when the heat generated by the reactor 821 is at a high level (e.g., during neutron fission operations or early photo-fission operations, or combinations thereof) including a turbine 831 and generator 832 for generating electricity, for supplying to an electrical power grid 860, from the collected heat generated by the reactor 820.

However, when transitioning to heavier reliance on photo-fission reactions, or during a decontamination mode, a second, low power generation subsystem 839 is used that is more efficient at low power levels. Hence, the coolant subsystem 825 transitions to providing heat to the low power generation subsystem, a transition that may be gradual, or abrupt. Such a system may utilized an expander as described in the cited patent applications, for example, or it may use heat thermocouples or other power generation technologies to extract as much heat as possible.

Alternatively, both generation subsystems may operate during high heat generation stages, in a staged manner, with only the low heat system operating in the lower heat decontamination modes.

FIG. 11 shows an alternative control system for a combination plant (e.g., a retrofitted plant). In this case, in addition to controlling reactor accelerators 721, the control subsystem 727 will control a neutron control system 722 (e.g., control rods) which controls the flow of neutrons within the reactor core 723. In this case, the coolant subsystem 725 will likely include an emergency cooling system to cool the core in case of excessive standard neutron fission residual reactions. Such a combination plant may be operated not using spent fuel, but new fuel generated for the plant. The addition of the photo-fission reaction allows the fuel to be further depleted and decontaminated, potentially until little residual radioactivity remains.

The system of FIG. 11 could be operated in one of the modes of operation discussed above for FIG. 8, for example.

Alternatively, this system might use a modified second mode of operation where there are two phases of heat generation for any given fuel load, such as shown in FIG. 10. In this case, the first phase relies primarily on neutron fission for any given fuel load, transitioning into a second phase relying primarily on photo-fission. The loading of batches could be provided in a manner that ensures a relatively constant heat generation capability to maintain electric generation efficiency.

It is expected that the primary application of the disclosed methodology will be to supplement the electrical generation capability and to decontaminate fuel at existing nuclear plants, and for all new nuclear plants. The disclosed approach provides much better utilization of the energy of existing nuclear fuel supplies, and it aids in decontaminating spent fuel.

On existing sites, reactors for performing photo-fission reaction using spent fuel can be added to the existing plants as an additional source of generating heat for power generation and for waste decontamination. A process of loading the spent fuel into the new reactors is provided for such cases, including removing the spent fuel from current storage, loading the spent fuel into the new reactors, utilizing the spent fuel to generate electricity using a photo-fission reaction, while depleting the spent fuel of much or all of its radioactive components. Finally, the depleted spent fuel is removed from the reactor and stored on-site, or transported to a hazardous waste site for final disposal. In this manner, energy utilization of existing nuclear fuel can be greatly enhanced at existing facilities that already meet zoning and regulatory laws, with minimal additional handling or transport of the radioactive fuel.

In many situations, it may be desirable to retrofit existing nuclear reactors by partially or completely surrounding the reactor core with a plurality of accelerators, and, if required, adding additional shielding to protect from the energy beams, as described above. In such a situation, the accelerators may be controlled in a manner to extend the lifetime of a fuel load in the conventional reactor, and hence consume more of the fuel and increase the periods between fuel replacements, which typically require reactor shutdowns.

There are additional embodiments of this reactor design that would be useful for large area radioactive decontamination using a reactor design optimized for such decontamination. In such an "external Core design" the Gamma Ray emitters (or other type of accelerators) can be placed in a grid pattern in the surface of contaminated ground, such that the radioactive elements dispersed in the ground at, or obtained from, an unintended release of radiation or other accident, would be illuminated by the gamma rays (or other energy beams) such that the decay half-life would be accelerated by approximately 180 times within the irradiation zone.

Additionally, the above described external core reactors could be used to neutralize "Coreium" from a melted down reactor such as would be the case from the accidents at Chernobyl, Russia or Fukushima, Japan, for example. The melted down and damaged radioactive cores can be "cut" into free in sections via a remotely operated robot utilizing a fiber fed laser cutter such as by using a cutter utilizing the slab laser described in PCT Application Serial No. PCT/US2013/053166, incorporated herein by reference. Then, this nuclear material could be removed from the disaster site to be loaded into the above mentioned reactors to be neutralized on site or remotely using the accelerators to decompose the radioactive material. Alternatively, the damaged cores could first be surrounded by an accelerator array on-site to at least partially decontaminate the cores prior to their deconstruction and transport.

Such decontamination methods would include in the decontamination procedure concepts utilizing these systems for the neutralization of the ground released radioactive materials and the case of a damaged reactor core itself. By such methods all contaminated components and materials could be decontaminated and then safely disposed of.

Additionally the Gamma Ray emitters (accelerators) could be used above ground, such that contaminated population centers could be decontaminated by virtue of gamma ray illumination from said accelerators and gamma ray emitter systems, such as when an area is intentionally irradiated such as through use of a dirty bomb comprising radioactive substances, or subsequent to a nuclear strike using a nuclear weapon.

Dielectric Accelerators

Examples of acceptable energy beam accelerators for use in reactors as described herein include Diamond Dielectric Wall Accelerator (DDWA) architectures with designs for use of materials and fabrication techniques that can provide higher performance levels in such devices, at arguably lower costs than previous designs. The proposed architectures, such as disclosed in PCT/US14/38386, incorporate practical means of constructing, mounting and insulating the very high operating voltages, while cooling the device for high average power use as well. Such a DDWA can utilize any of a number of existing particle generator devices to provide desired source particles, although a dense plasma flux proton injector (DPF) represents an improvement on existing devices. Such a DPF can be used in a DDWA having a stacked capacitor array constructed of robust parallel electrodes (forming individual capacitors).

The Diamond Dielectric Wall Accelerator (DDWA) of the example can be provided to, for example, operate at 125 kV. per capacitor accelerator element or more. At the 125 kV level, an accelerator head provided to achieve 45 MeV electrons that would be expected to produce 16 MeV Gamma Rays would be on the order of 36 cm long. This would be compared to 2 MeV per meter in a quadra pole Radio Frequency accelerator of a conventional design.

In this example, each discharge of the DPF creates high electric currents (in a monolithic solid tube electrode) that are mirrored on the inner surface. These currents ionize and accelerate hydrogen gas into the end of the central electrode; at this location each discharge path creates tornado-like plasma discharge at the very end of the tube where ionized and accelerated protons are able to be trapped within a single vortex apex region, within the central bore of the boron tube. It is at this exact point that the combined plasma discharges are concentrated and some of the boron operating at high temperatures can encounter hydrogen ions that are also stripped of their electrons (i.e., protons) and be acted upon by the combined plasma vortexes at the very center of the end of the central electrode that is, in this case, made from Boron. In this location the magnetic forces from the individual vortexes also concentrate the plasma and create the conditions for fusion reactions to occur. The resulting helium and unreacted protons are able to be the injection material for subsequent acceleration within the DDWA. The advantage to this scheme is that the particles will be accelerated from the plasma injector at several hundred keV of energy or speed. This shortens the needed acceleration tube length within the DDWA to achieve a certain purpose.

Any atomic plasma ions or gas ions can be so accelerated. The electrode material would not necessarily be boron for non-fusion based reactions. In this case, the plasma focus device is only a compact ion accelerator/injector.

The architecture of the Dielectric Wall Accelerator (DWA) segment receiving the DPF particles is comprised of a hollow cylinder that forms the vacuum containment section of the particle accelerator. The chosen design length for this example tube segment is about a meter long or more. It is constructed to be an insulated, large (4 cm in this case) bore tube constructed of adjacent parallel rings of metal film imbedded and mounted and insulated from each other, within the sufficiently thick wall of the tube. These metal film rings form a capacitor network that has an effect of averaging the voltage gradient of the sequentially fired capacitors that are stacked on the outside wall of the accelerator tube. The effect is due to a mirrored charge, induced and thus impressed upon each ring which represents an individual capacitor element within the wall of the bore tube.

The current propagating along the electrode skin of each of the discharging capacitor elements forming a pulse forming network (PFN) are in fact supplying the accelerating electromotive force, acting upon any charged particle within the bore of the accelerator tube, by the act of being sequentially fired in a very controlled timed sequenced event (described below), an accelerating force of very high specific energy density is applied to the particles within the tube.

Although gallium arsenide or silicon carbide photo-switches could be used as the active component to facilitate controlled very short time duration conduction at high voltages, permitting switching at high voltages and high currents upon the illumination of a several nanosecond laser pulse delivered via a discrete optical fiber, such devices typically operate at high currents at lower voltages or high voltages at lower currents. Single diamond crystal or diamond-like carbon (DLC) photo-switches (i.e., replacing the gallium arsenide or silicon carbide with the diamond material) can be used to overcome these mentioned limitations. The salient point is that the prior art materials have a breakdown voltage of 3-3.5 million volts per meter, whereas single crystal diamond and 70% tetrahedral DLC diamond has a breakdown voltage of about 10 Billion volts per meter. This permits a practical single crystal diamond photoswitch to have a breakdown voltage, for a 1 mm device, at 10 million volts. Clearly, the breakdown voltage of a cooling medium such a device resided or operated in could be the dominant operational factor. The Breakdown voltage for highly deionized water is 400 kV/cm. This suggests using a photoswitch placement architecture that maximizes the material characteristics of the DDWA The architecture of the placement of the capacitor elements or layers is such that there is a space between each capacitor disc, which is a layer of discretely spaced ribs on one face of the disc, which permits the forced flow of the deionized water coolant along the axis of the tube and capacitor array but which exits transverse to the axis of the tube through the spaces created between the capacitor disc elements of the PFN due to the presence of the described ribs. The water is pumped into the apex spaces of the polygonal (e.g., hexagonal) hole, constituting the inner aperture and cumulative water manifold, of the individual capacitor segment. A series of discrete capacitors are stacked next to each other forming a capacitor array, the axial sum of capacitors supplying the energy storage and providing a fast discharge circuit of the sequentially fired PFN. A single capacitor element can be comprised of two parallel plate transmission lines (electrodes) stacked upon one another with one or more photo switches mounted between the two conductors.

Figure 12:
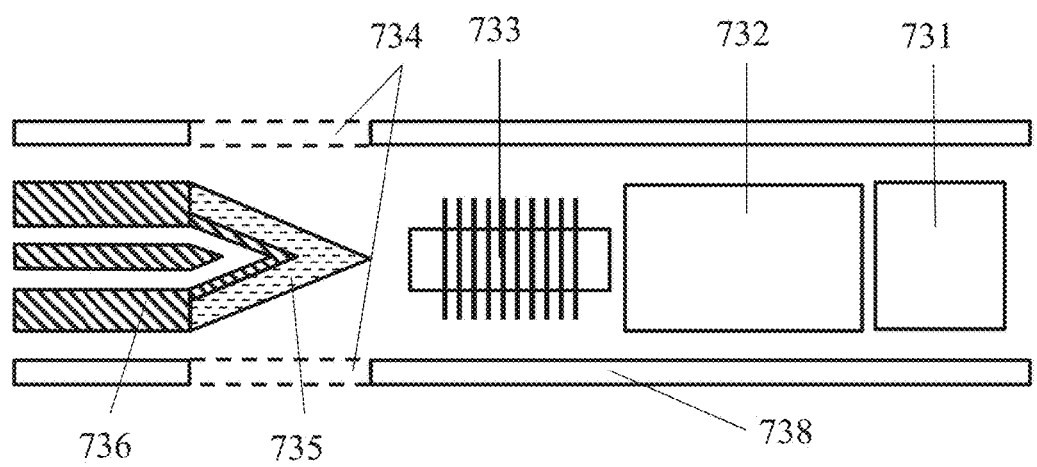
FIG. 12 is an example DDWA that can be used in the example nuclear reactors for supporting photo-fission reactions.

FIG. 12 shows a schematic diagram of an example dielectric accelerator device for generating an energy beam, as described herein, used as a source for a gamma ray emitter. This setup includes: a particle injector 731 (such as an improved dense plasma fusion (DPF) device); a diamond dielectric wall accelerator assembly (DDWA) 732; a reflectron 733; a gamma ray window 734 (e.g., an alumina ceramic-sapphire-edge defined grown tube window or sintered ceramic tube); a gamma ray emitter cone 735 (e.g., a high temperature high atomic weight material, such as reference thorium oxide); a heat exchanger submount 736 (e.g., a reactively created silicon carbide cooling plenum); and a vacuum containment cylinder 738 providing utility structure support. Such a device is described in more detail in PCT/US14/38386 filed on May 16, 2014, and incorporated herein by reference.

Hence, the DDWA shown in FIG. 12 may be utilized, among others, as the energy beam accelerator devices used in the reactor designs discussed in this application.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method of retrofitting a nuclear reactor comprising the steps of:
   providing a nuclear reactor including radioactive fuel installed in a reactor core, said reactor designed to generate heat by controlling a neutron fission process;
   subsequent to operating the neutron fission process in said nuclear reactor, installing a plurality of emitter devices each configured to generate an energy beam impinging on the reactor core to induce a photo-fission reaction in the fuel.

2. The method of claim 1, further comprising the step of installing additional shielding in said nuclear reactor to absorb portions of the energy beam not absorbed by the reactor core or the fuel.

3. The method of claim 1, further comprising the step of extracting heat from said nuclear reactor during said photo-fission process to perform useful work.

4. The method of claim 1, further comprising the step of, after at least partially depleting said fuel using neutron fission, at least partially decontaminating said fuel using the photo-fission process over a period of time.

5. The method of claim 1, wherein said emitter device comprises:
   a source of charged particles;
   a conduit;
   a plurality of capacitor elements stacked to form a capacitor array configured to accelerate the charged particles through the conduit which is formed through the capacitor array, each one of said capacitor elements utilizing a pair of electrodes having a layer including diamond or diamond-like carbon, and a plurality of photo switches each including a diamond crystal and being uniformly arranged around the capacitor element for activation during a discharge of the capacitor element; and
   a cooling system for circulating a coolant in the device for cooling the device, wherein
   said device is adapted to emit an energy beam including gamma rays as a result of accelerating the charged particles.

6. The method of claim 5, wherein each emitter device comprises a plurality of capacitor elements each including a pair of electrodes having a layer including diamond or diamond-like carbon.

7. The method of claim 6, wherein each emitter device comprises a plurality of photo switches each including a diamond crystal and being uniformly arranged around the capacitor element for activation during a discharge of the capacitor element.

8. The method of claim 5, further comprising the step of installing additional shielding in said nuclear reactor to absorb portions of the energy beam not absorbed by the reactor core or the fuel.

9. The method of claim 5, further comprising the step of, after at least partially depleting said fuel using neutron fission, at least partially decontaminating said fuel using the photo-fission process over a period of time.

10. A method of retrofitting a nuclear reactor comprising the steps of:
    providing a nuclear reactor including radioactive fuel installed in a reactor core, said reactor designed to generate heat by controlling a neutron fission process;
    subsequent to operating the neutron fission process in said nuclear reactor, installing a plurality of emitter devices each arranged to focus an energy beam to impinge on the reactor core to induce a photo-fission reaction in the fuel, said emitter device comprising:
    a conduit, and
    a plurality of capacitor elements stacked to form a capacitor array configured to accelerate the charged particles through the conduit which is formed through the capacitor array, wherein
    said emitter device is adapted to emit the energy beam including gamma rays as a result of accelerating the charged particles.

11. The method of claim 10, wherein each one of said capacitor elements utilizes a pair of electrodes having a layer including diamond or diamond-like carbon.

12. The method of claim 10, wherein each emitter device comprises a plurality of photo switches each including a diamond crystal.

13. The method of claim 12, wherein said photo switches are uniformly arranged around the capacitor elements for activation during a discharge of the capacitor elements.

14. The method of claim 10, further comprising the step of installing additional shielding in said nuclear reactor to absorb portions of the energy beam not absorbed by the reactor core or the fuel.

15. The method of claim 10, further comprising the step of, after at least partially depleting said fuel using neutron fission, at least partially decontaminating said fuel using the photo-fission process over a period of time.

16. A method of retrofitting a nuclear reactor comprising the steps of:

providing a nuclear reactor including radioactive fuel installed in a reactor core, said reactor designed to generate heat by controlling a neutron fission process;

subsequent to operating the neutron fission process in said nuclear reactor, performing the steps of:

installing a plurality of emitter devices each configured to generate an energy beam impinging on the reactor core to induce a photo-fission reaction in the fuel, installing additional shielding in said nuclear reactor to absorb portions of the energy beam not absorbed by the reactor core or the fuel, and after at least partially depleting said fuel using neutron fission, at least partially decontaminating said fuel using the photo-fission process over a period of time;

wherein said emitter device comprises:

a conduit;

a plurality of capacitor elements stacked to form a capacitor array configured to accelerate charged particles through the conduit which is formed through the capacitor array, each one of said capacitor elements utilizing a pair of electrodes having a layer including diamond or diamond-like carbon, and a plurality of photo switches each including a diamond crystal and being uniformly arranged around the capacitor element for activation during a discharge of the capacitor element; and a cooling system for circulating a coolant in the device for cooling the device, wherein said emitter device is adapted to emit the energy beam including gamma rays as a result of accelerating the charged particles.

\* \* \* \* \*